US007930211B2

(12) United States Patent
Crolley (10) Patent No.: US 7,930,211 B2
(45) Date of Patent: Apr. 19, 2011

(54) SYSTEM AND METHOD OF PROVIDING ADVERTISEMENTS TO PORTABLE COMMUNICATION DEVICES

(75) Inventor: C. Wayne Crolley, Bryant, AR (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1099 days.

(21) Appl. No.: 11/110,938

(22) Filed: Apr. 20, 2005

(65) Prior Publication Data

US 2006/0242009 A1     Oct. 26, 2006

(51) Int. Cl.
*G06Q 30/00* (2006.01)
(52) U.S. Cl. ............... 705/14.64; 705/14.4; 705/14.49; 705/14.58; 705/10; 370/254; 370/259
(58) Field of Classification Search .................... 705/14, 705/10, 14.27, 14.28, 14.45, 14.52, 14.6, 705/14.64, 14.4, 14.49, 14.58; 370/254, 370/259
See application file for complete search history.

(56) References Cited

U.S. PATENT DOCUMENTS

| | | | |
|---|---|---|---|
| 5,214,793 A | | 5/1993 | Conway et al. |
| 5,235,633 A | | 8/1993 | Dennison et al. |
| 5,295,180 A | | 3/1994 | Vendetti et al. |
| 5,627,549 A | | 5/1997 | Park |
| 5,797,097 A | | 8/1998 | Roach et al. |
| 5,903,816 A | * | 5/1999 | Broadwin et al. ............ 725/110 |
| 5,943,653 A | | 8/1999 | Ross et al. |
| 5,999,525 A | * | 12/1999 | Krishnaswamy et al. .... 370/352 |
| 6,178,411 B1 | | 1/2001 | Reiter |
| 6,253,146 B1 | | 6/2001 | Hanson et al. |
| 6,269,361 B1 | | 7/2001 | Davis et al. |
| 6,332,127 B1 | * | 12/2001 | Bandera et al. ................. 705/14 |
| 6,335,927 B1 | * | 1/2002 | Elliott et al. ................... 370/352 |
| 6,363,250 B1 | | 3/2002 | Lindell |
| 6,381,534 B2 | | 4/2002 | Takayama et al. |
| 6,405,364 B1 | * | 6/2002 | Bowman-Amuah .......... 717/101 |
| 6,422,464 B1 | * | 7/2002 | Terranova ...................... 235/384 |
| 6,526,275 B1 | * | 2/2003 | Calvert .......................... 455/418 |

(Continued)

FOREIGN PATENT DOCUMENTS

EP     1 115 077 A2     7/2001

(Continued)

OTHER PUBLICATIONS

Office Action dated Apr. 4, 2008; U.S. Appl. No. 11/110,970; Filed Apr. 20, 2005; 14 pages.

(Continued)

*Primary Examiner* — James W Myhre
*Assistant Examiner* — Adam Chornesky
(74) *Attorney, Agent, or Firm* — Toler Law Group (57) ABSTRACT

A method of advertising is disclosed and includes monitoring the location of one or more portable communication devices in communication with a data network as the one or more portable communication devices travel within a user vehicle along a freeway. The method further includes determining whether the one or more portable communication devices are within a predetermined range of a freeway exit. Additionally, the method includes determining one or more types of media files supported by the one or more portable communication devices and transmitting one or more advertisements to the one or more portable communication devices. The advertisement is delivered in a format based on the determined one or more types of media files supported by the one or more portable communication devices.

19 Claims, 6 Drawing Sheets

U.S. PATENT DOCUMENTS

| | | | |
|---|---|---|---|
| 6,570,851 B1* | 5/2003 | Koskelainen et al. | 370/231 |
| 6,731,625 B1* | 5/2004 | Eastep et al. | 370/352 |
| 6,795,700 B2* | 9/2004 | Karaoguz et al. | 455/408 |
| 6,842,620 B2 | 1/2005 | Smith et al. | |
| 6,845,091 B2* | 1/2005 | Ogier et al. | 370/338 |
| 6,847,822 B1 | 1/2005 | Dennison et al. | |
| 6,912,230 B1 | 6/2005 | Salkini et al. | |
| 6,944,447 B2* | 9/2005 | Portman et al. | 455/422.1 |
| 6,993,326 B2* | 1/2006 | Link et al. | 455/414.1 |
| 7,099,936 B2* | 8/2006 | Chase et al. | 709/223 |
| 7,103,368 B2* | 9/2006 | Teshima | 455/456.3 |
| 7,110,880 B2 | 9/2006 | Breed et al. | |
| 7,120,235 B2* | 10/2006 | Altberg et al. | 379/114.13 |
| 7,127,261 B2* | 10/2006 | Van Erlach | 455/456.5 |
| 7,130,807 B1* | 10/2006 | Mikurak | 705/7 |
| 7,289,531 B2* | 10/2007 | Van Den Bosch et al. | 370/466 |
| 7,305,240 B2 | 12/2007 | Chou et al. | |
| 7,343,317 B2* | 3/2008 | Jokinen et al. | 705/14 |
| 7,367,042 B1* | 4/2008 | Dakss et al. | 725/60 |
| 7,369,856 B2* | 5/2008 | Ovadia | 455/439 |
| 7,418,402 B2 | 8/2008 | McCrossin et al. | |
| 2001/0044751 A1* | 11/2001 | Pugliese et al. | 705/26 |
| 2002/0022476 A1* | 2/2002 | Go | 455/414 |
| 2002/0032035 A1* | 3/2002 | Teshima | 455/456 |
| 2002/0037716 A1 | 3/2002 | McKenna et al. | |
| 2002/0046084 A1* | 4/2002 | Steele et al. | 705/14 |
| 2002/0049640 A1 | 4/2002 | Sheriff et al. | |
| 2002/0147634 A1* | 10/2002 | Jacoby et al. | 705/14 |
| 2002/0147645 A1 | 10/2002 | Alao et al. | |
| 2002/0161598 A1 | 10/2002 | Kim | |
| 2002/0161646 A1* | 10/2002 | Gailey et al. | 705/14 |
| 2003/0036848 A1 | 2/2003 | Sheha et al. | |
| 2003/0046158 A1* | 3/2003 | Kratky | 705/14 |
| 2003/0046420 A1 | 3/2003 | Breiter et al. | |
| 2003/0065805 A1 | 4/2003 | Barnes, Jr. | |
| 2003/0070167 A1 | 4/2003 | Holtz et al. | |
| 2003/0074207 A1 | 4/2003 | Pace et al. | |
| 2003/0134648 A1* | 7/2003 | Reed et al. | 455/456 |
| 2003/0200299 A1 | 10/2003 | Jamison, III | |
| 2003/0208754 A1* | 11/2003 | Sridhar et al. | 725/34 |
| 2003/0216960 A1* | 11/2003 | Postrel | 705/14 |
| 2003/0220835 A1* | 11/2003 | Barnes, Jr. | 705/14 |
| 2004/0002896 A1* | 1/2004 | Alanen et al. | 705/14 |
| 2004/0015824 A1* | 1/2004 | Felkey et al. | 717/104 |
| 2004/0036622 A1 | 2/2004 | Dukach et al. | |
| 2004/0054589 A1* | 3/2004 | Nicholas et al. | 705/14 |
| 2004/0076279 A1 | 4/2004 | Taschereau | |
| 2004/0122735 A1 | 6/2004 | Meshkin | |
| 2004/0143842 A1 | 7/2004 | Joshi | |
| 2004/0203712 A1 | 10/2004 | Murai et al. | |
| 2004/0215559 A1 | 10/2004 | Rebenack et al. | |
| 2004/0220881 A1 | 11/2004 | Powell | |
| 2004/0225564 A1 | 11/2004 | Walsh et al. | |
| 2004/0225746 A1 | 11/2004 | Niell et al. | |
| 2004/0260470 A1 | 12/2004 | Rast | |
| 2004/0267617 A1* | 12/2004 | Yanase | 705/14 |
| 2005/0009499 A1 | 1/2005 | Koster | |
| 2005/0021401 A1 | 1/2005 | Postrel | |
| 2005/0027590 A9* | 2/2005 | Gailey et al. | 705/14 |
| 2005/0027591 A9* | 2/2005 | Gailey et al. | 705/14 |
| 2005/0027594 A1 | 2/2005 | Yasnovsky et al. | |
| 2005/0030907 A1 | 2/2005 | Lou et al. | |
| 2005/0055431 A1 | 3/2005 | Jones et al. | |
| 2005/0065844 A1 | 3/2005 | Raj et al. | |
| 2005/0075093 A1 | 4/2005 | Lei et al. | |
| 2005/0079878 A1 | 4/2005 | Smith et al. | |
| 2005/0102180 A1* | 5/2005 | Gailey et al. | 705/14 |
| 2005/0107066 A1 | 5/2005 | Erskine et al. | |
| 2005/0144243 A1 | 6/2005 | Cheng | |
| 2005/0154996 A1* | 7/2005 | Othmer | 715/774 |
| 2005/0209861 A1 | 9/2005 | Hewes et al. | |
| 2005/0221843 A1* | 10/2005 | Friedman et al. | 455/456.6 |
| 2005/0227700 A1 | 10/2005 | Kirkland et al. | |
| 2005/0289590 A1* | 12/2005 | Cheok et al. | 725/37 |
| 2006/0020548 A1 | 1/2006 | Flather | |
| 2006/0026067 A1* | 2/2006 | Nicholas et al. | 705/14 |
| 2006/0036548 A1* | 2/2006 | Roever et al. | 705/51 |
| 2006/0059511 A1 | 3/2006 | Nocifera et al. | |
| 2006/0074764 A1 | 4/2006 | Schmitt et al. | |
| 2006/0087979 A1 | 4/2006 | Schine et al. | |
| 2006/0092931 A1 | 5/2006 | Walter et al. | |
| 2006/0106850 A1 | 5/2006 | Morgan et al. | |
| 2006/0111967 A1* | 5/2006 | Forbes | 705/14 |
| 2006/0116507 A1 | 6/2006 | Oppermann et al. | |
| 2006/0167784 A1* | 7/2006 | Hoffberg | 705/37 |
| 2006/0178932 A1* | 8/2006 | Lang | 705/14 |
| 2006/0184640 A1 | 8/2006 | Hatch | |
| 2006/0200381 A1 | 9/2006 | Elkholy et al. | |
| 2006/0211437 A1 | 9/2006 | Yang | |
| 2006/0239254 A1* | 10/2006 | Short et al. | 370/352 |
| 2006/0240808 A1* | 10/2006 | Crolley | 455/414.1 |
| 2006/0242009 A1* | 10/2006 | Crolley | 705/14 |
| 2006/0242010 A1 | 10/2006 | Crolley | |
| 2007/0013548 A1 | 1/2007 | Sendrowicz | |
| 2007/0061205 A1 | 3/2007 | Crolley | |
| 2007/0094698 A1 | 4/2007 | Bountour et al. | |
| 2007/0208864 A1 | 9/2007 | Flynn et al. | |
| 2007/0287473 A1 | 12/2007 | Dupray | |
| 2008/0010372 A1 | 1/2008 | Khedouri et al. | |
| 2008/0097858 A1 | 4/2008 | Vucina et al. | |

FOREIGN PATENT DOCUMENTS

EP  1 202 203 A3  10/2003

OTHER PUBLICATIONS

Office Action dated Nov. 18, 2008; U.S. Appl. No. 11/110,970; Filed Apr. 20, 2005; 29 pages.

Final Office Action dated May 7, 2009; U.S. Appl. No. 11/110,970; Filed Apr. 20, 2005; 32 pages.

Office Action dated Oct. 7, 2009; U.S. Appl. No. 11/110,970; Filed Apr. 20, 2005; 33 pages.

Final Office Action dated Mar. 30, 2010; U.S. Appl. No. 11/110,970; Filed Apr. 20, 2005; 37 pages.

Office Action dated Oct. 17, 2008; U.S. Appl. No. 11/517,026; Filed Sep. 9, 2006; 18 pages.

Final Office Action dated Mar. 30, 2009; U.S. Appl. No. 11/517,026; Filed Sep. 7, 2006; 22 pages.

Office Action dated Aug. 5, 2009; U.S. Appl. No. 11/517,026; Filed Sep. 9, 2006; 26 pages.

Office Action dated Mar. 10, 2010; U.S. Appl. No. 11/517,026; 33 pages.

* cited by examiner

SYSTEM AND METHOD OF PROVIDING ADVERTISEMENTS TO PORTABLE COMMUNICATION DEVICES

FIELD OF THE DISCLOSURE

The present disclosure relates to wireless communication and providing advertisements via portable communication devices.

BACKGROUND

Portable communication devices, e.g., cellular telephones, portable digital assistants, 802.11 devices, are very useful for obtaining information while traveling. For example, a user can call an information service to obtain the location of a gas station, restaurant, etc. Further, a user can access the Internet or a Wide Area Network via a portable communication device and input a query in order to obtain information about a business, a local attraction, a civic event, or any other point of interest. These systems are not proactive and require an input from a user before information about a business, location, etc. is sent to the requesting device. Additionally, GPS systems have been provided that can track the location of a user and show the location of the user on an electronic map. However, these systems include limited information and typically, the electronic map provided by the GPS system is simply a map with little other information, e.g., information about the hours of operation of a particular business or point of interest. Also, with the proliferation of various different device types and media requirements it is difficult to distribute an advertisement in a single format.

Accordingly, there is a need for an improved system and method of providing advertisements to portable communication devices.

BRIEF DESCRIPTION OF THE DRAWINGS

The present disclosure is pointed out with particularity in the appended claims. However, other features are described in the following detailed description in conjunction with the accompanying drawings in which:

DETAILED DESCRIPTION OF THE DRAWINGS

A method of advertising is disclosed and includes monitoring the location of one or more portable communication devices in communication with a data network as the one or more portable communication devices travel within a user vehicle along a freeway. Due to the linear nature of most major interstate highways, a series of antennas that are parallel to the highway facilitate the tracking of devices through a series of antenna transmission patterns. As a vehicle travels along a highway in a linear manner, a portable communication device that is located within the vehicle also passes through the transmission patterns, which overlap the highway. As the device passes through the transmission range of each antenna, the device can be identified and can be communicated with via the antenna. Identification information of each device can then be transmitted back to a server for entry into a database. Further, the identification information can be used to determine what message type is to be transmitted to the device.

After the device passes through a series of antenna transmission ranges, the information on the device identification, and the time and date can be used to reasonably determine both the direction of travel and estimated speed of the vehicle in which the wireless device is traveling. Subsequently, speed and direction of travel information can be used for various functions such as estimating the time of arrival and the next anticipated wireless antenna location, etc. This method of tracking and transmitting messages to devices is independent of the wireless infrastructure and is intended to be used with any wireless networking technologies or a combination of different wireless network technologies.

The method further includes determining whether the one or more portable communication devices are within a predetermined range of a freeway exit. Each antenna tower's geographic location is associated with one or more highway exits and services located at that exit. This facilitates the association of a device to a particular antenna, its geographic location, direction and speed of travel, and subsequently provides for relative information of upcoming exits and the services available at those exits.

Additionally, the method further includes the determination of the number of devices within the transmission pattern of a wireless antenna and the duration of time in which the device has remained within that pattern. Also, the method further includes the tracking of a particular device as it passes through a series of transmission patterns, which can be used to make a determination of the estimated arrival at the next antenna. This method is used to allow the system to anticipate and "watch for" a particular device as it travels along an interstate highway. Additionally, the method includes determining one or more types of media files supported by the one or more portable communication devices and transmitting one or more advertisements to the one or more portable communication devices. The advertisement is delivered in a format based on the determined one or more types of media files supported by the one or more portable communication devices.

In a particular embodiment, the method also includes polling the one or more portable communication devices in order to determine the one or more types of media files supported. Alternatively, the method includes querying a database in order to determine the one or more types of media files supported by the one or more portable communication devices. The database can queried with a user identification associated with the one or more portable communication devices. Also, the database can be queried with a make and model identification associated with the one or more portable communication devices.

Additionally, the device intended to be used as a target device for this service can be registered with the provider prior to its use. The method can allow the provider to compare the make and model of the registered device to a database of hardware and software configurations, as well as features and functionalities of the device, in order to determine the most robust media the device could receive.

In another particular embodiment, the advertisement is associated with a business that is accessible via the freeway exit and the advertisement is transmitted based on a service level agreement of the business. Additionally, the service level agreement can include four service tiers and the method further comprises charging a business to advertise based on one of the four service tiers. In a particular embodiment, a first service tier provides for text message advertisements, a second service tier provides for still graphical advertisements, a third service tier provides for streaming video and audio advertisements, and a fourth service tier provides for real-time voice and video advertisements. Also, in a particular embodiment, the method includes retrieving an advertisement from a database based on a service tier associated with the business and the one or more types of media files supported by the one or more portable communication devices. The method also includes charging the business for transmitting the advertisement based on the one or more types of media files supported by the portable communication devices and the service tier.

In another embodiment, a system is disclosed and includes at least one wireless communication access point that is deployed along a freeway. Further, a database is coupled to the server. In this embodiment, the database stores one or more media files that are associated with one or more advertisements. Also, the database stores information concerning the types of media files supported by one or more portable communication devices. The system also includes a server that is coupled to the database and that has access to the at least one wireless communication access point. In this embodiment, the server includes a processor, a computer readable medium that is accessible to the processor and a computer program that is embedded within the computer readable medium. The computer program includes instructions to monitor the location of the one or more portable communication devices in communication with a data network as the one or more portable communication devices travel within a user vehicle along a freeway. Additionally, the computer program includes instructions to determine the one or more types of media files supported by the one or more portable communication devices and instructions to transmit one or more advertisements to the one or more portable communication devices based on the location of the one or more portable communication devices and the one or more types of media files supported by the one or more portable communication devices.

In yet another embodiment, a server is disclosed and includes a processor and a computer readable medium accessible to the processor. A computer program is embedded within the computer readable medium and includes instructions to monitor a location of a portable communication device traveling along a freeway within a user vehicle and instructions to retrieve at least one advertisement from a database. The advertisement has a format that is based on a media file type supported by the portable communication device and that is based on a service tier level. The media file type complies with the service tier level or a lower service tier level.

Figure 1:
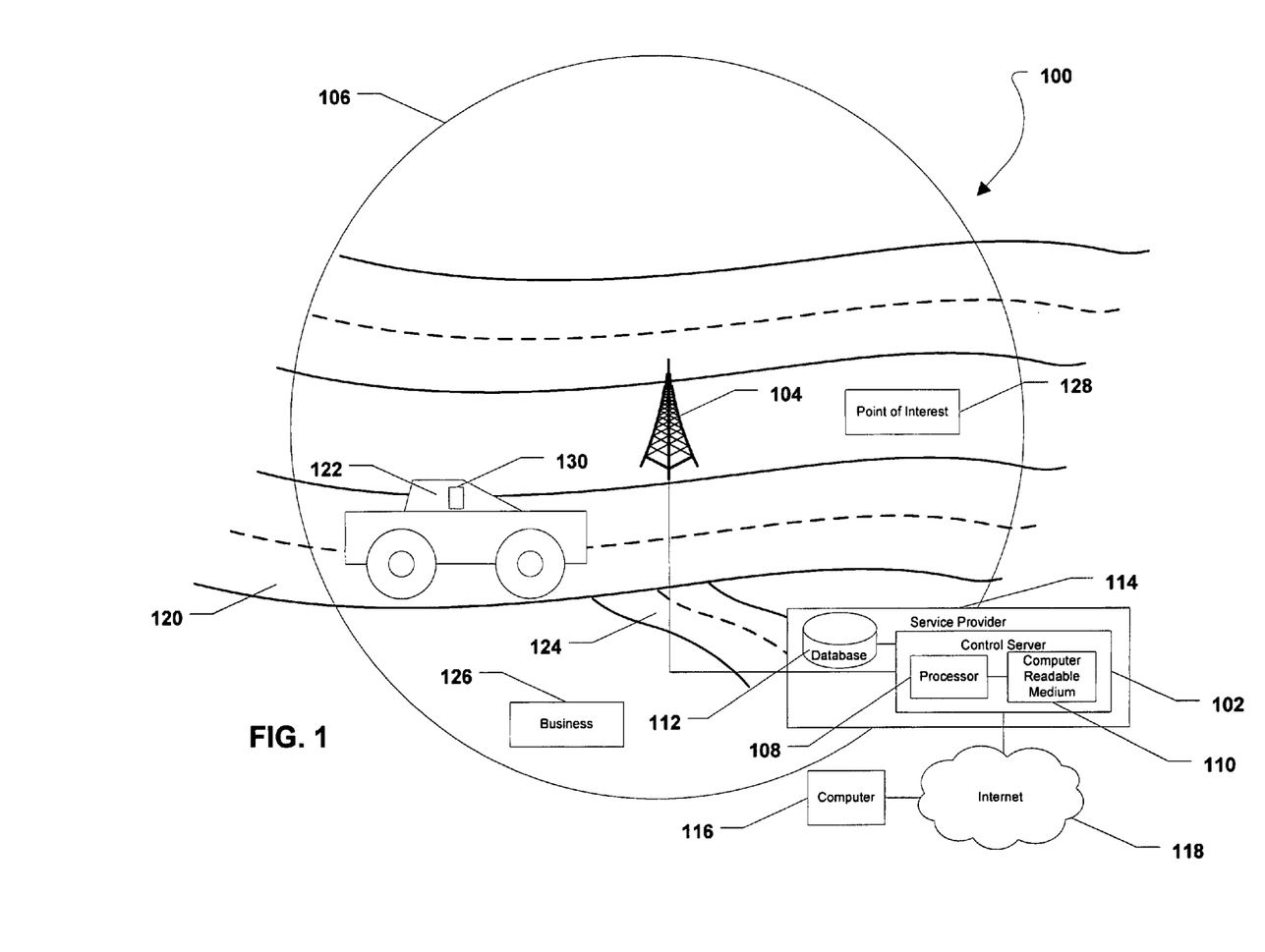
FIG. 1 is a block diagram representative of a wireless communication system over which one or more advertisements can be transmitted.

Referring initially to FIG. 1, a system of advertising to wireless devices is shown and is generally designated 100. As shown, the system 100 includes a system server 102 coupled to a wireless antenna 104. The wireless antenna 104 provides a coverage area 106 for the system 100. As depicted in FIG. 1, the system server 102 includes a processor 108 and a computer readable medium 110 that is accessible to the processor 108. A database 112 is also coupled to the system server 102. In a particular embodiment, the database 112 includes user information, e.g., the identifications of subscriber devices. Further, the database 112 can include a plurality of advertisements associated with one or more businesses within the coverage area provided by the system 100 shown in FIG. 1. As shown, the system server 102, the processor 108, the computer readable medium 110, and the database 112 can be co-located at a service provider 114.

FIG. 1 further shows that a computer 116 can be coupled to the system server 102 via the Internet or a Wide Area Network 118. A system manager or some other person, e.g., a subscriber, can communicate with the system server 102 using the computer 116. As illustrated in FIG. 1, the wireless antenna 104 can be deployed so that the coverage area 106 provided by the wireless antenna 104 overlaps a freeway 120. In a particular embodiment, the freeway 120 can be any type of roadway used to carry public transportation, e.g., one or more vehicles 122. Also, the freeway 120 can include at least one freeway exit 124 that provides access to one or more businesses 126. The wireless antenna 104 can be deployed so that it is adjacent to, or proximal to, the freeway exit 124. Further, the wireless antenna 104 can be deployed so that it is adjacent to, or proximal to, a point of interest 128.

In a particular embodiment, the system server 102 can include a computer program embedded within the computer readable medium 110. The computer program can include logic to execute a method that allows the system server 102 to monitor the movement of a portable communication device 130 within the vehicle 122 as it progresses along a highway. As the vehicle 122 and the portable communication device 130 approach the freeway exit 124, one or more advertisements associated with the one or more businesses 126 that are accessible via the freeway exit can be automatically transmitted to the portable communication device 130. Information such as other services available via the freeway exit 124 can also be provided. Further, as the vehicle 122 and the portable communication device 130 approach the point of interest 128, information related to the point of interest 128 can be automatically transmitted to the portable communication device 130. As described in detail below, other information, including traffic alerts, can be transmitted to the portable communication device 130.

Figure 2:
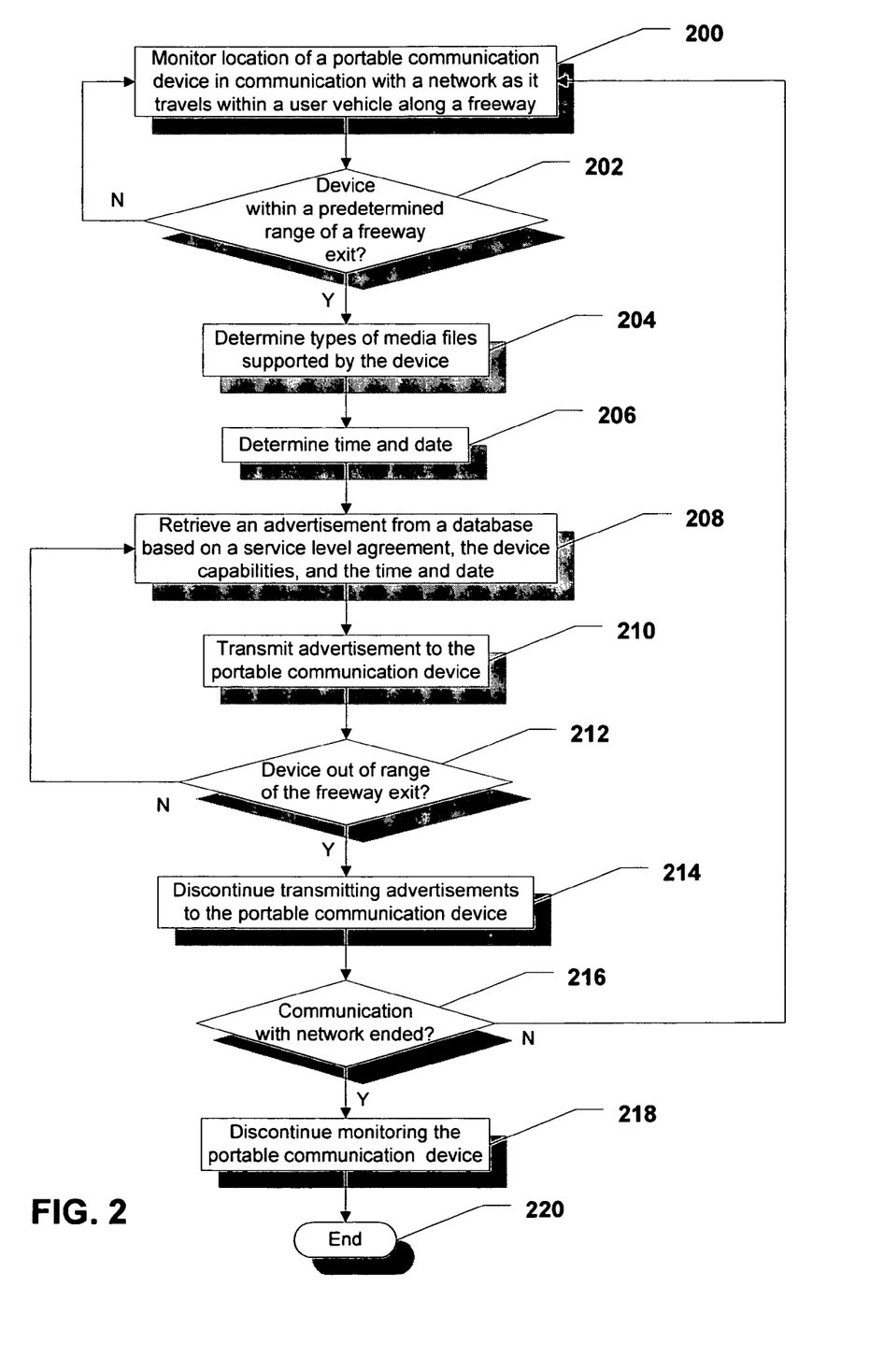
FIG. 2 is a flow chart to illustrate a method of transmitting advertisements associated with one or more businesses at a freeway exit.

Referring to FIG. 2, a method of advertising to a wireless device is shown and commences at block 200. At block 200, a system server monitors the presence of and movement of a portable communication device while it is in communication with a network as it travels within a user vehicle along a freeway, highway, etc. Since most freeways are relatively linear, the server can more easily track the movement of a portable communication device and estimate when the portable communication device will reach a particular location, e.g., a freeway exit, point of interest, etc.

At decision step 202, the server determines whether the device is within a predetermined range of a freeway exit. If not, the logic returns to block 200 and the server continues to monitor the location of the portable communication device. At decision step 202, if the device is within a predetermined range of a freeway exit, the method moves to block 204 and the server determines the capabilities of the device, e.g., what types of media files are supported by the device.

In an illustrative embodiment, the media files supported by the portable communication device can be audio data files, video data files, still image data files, etc. Particularly, the still image data files can be joint photographic experts group (JPEG) data files, graphics interchange format (GIF) data files, tagged image data file format (TIFF) data files, Adobe Photoshop (PSD) data files, portable networks graphics (PNG) data files, windows metadata file (WMF) data files, Hypertext (HTML), Java, or any other types of image data files that can be downloaded to and viewed at the portable computing device.

Further, the video data files can be moving picture experts group (MPEG) data files, audio video interleave (AVI) data files, Windows media video (WMV) data files, advanced streaming format (ASF) data files, Quicktime (MOV) data files, Real Media (RM) data files, or any other type of video data files that can be downloaded to and viewed at portable computing device.

In a particular embodiment, the audio data files can be MPEG audio layer three (MP3) data files, waveform audio format (WAV) data files, windows media audio (WMA) data files, OGG data files, Monkey's Audio digital data files (APE) data file, VOX data files, Real Audio (RA) data files, synthetic music mobile application format (MMF) data files, musical instrument digital interface (MID) data files, phrase format (SPF) data files, Qualcomm PureVoice audio data files (QCP) or any other sound data files that can be listened to at the portable computing device. In an illustrative embodiment, real-time voice and video can be transmitted using the real-time protocol (RTP) and the video datagram protocol (VDP).

In a particular embodiment, the server can retrieve the information concerning the media files supported by a particular device from a database by querying the database with a user identification. The information can also be retrieved by querying the database with a device make and model identification. Further, in an alternative embodiment, the server can poll the device in order to make this determination. Thereafter, at block 206, the server determines the time and date.

Proceeding to block 208, the server retrieves an advertisement from a database. In a particular embodiment, the advertisement is associated with a business that is accessible via the exit and the server retrieves the advertisement based on the device capabilities and the time and date determined above. Further, in a particular embodiment, the advertisement is retrieved based on a service level agreement that is associated with the business. In an illustrative embodiment, the service level agreement can provide for four tiers of service. For example, the service level agreement can provide a first service tier that provides for text message advertisements, a second service tier that provides for still graphical advertisements, a third service tier that provides for streaming video and audio advertisements, and a fourth service tier that provides for real-time voice and video advertisements. Moving to block 210, the server transmits the advertisement to the portable communication device based on the service tier and in a format supported by the particular target device.

In a particular embodiment, advertising customers can be charged based on the service level agreement. For example, a fourth service tier advertisement may be the most expensive advertisement and the first service tier advertisement may be the least expensive advertisement. Since the server polls a portable communication device to determine a supported media type before sending an advertisement, advertisements are delivered in the supported format to be received and viewed at the portable communication device. Further, an advertising customer is charged for those advertisements that can be viewed at the device. In other words, an advertising customer may select a fourth service tier, but the advertising customer may only be charged for fourth service tier advertisements when real-time voice and video can be received and viewed at a particular portable communication device.

Additionally, since the server determines the time and date before transmitting advertisements, advertisements that are associated with a particular business may not be sent if the business is closed. Further, by monitoring the movement of a portable communication device while it is in communication with a network as it travels within a user vehicle along a freeway, advertisements can be sent for a business at the exit by which the business can be accessed. In an alternative embodiment, the server can begin transmitting advertisements one or more exits before the exit by which the business can be accessed. An advertisement customer can pay extra to have the server send advertisements to portable communication devices one or more exits before the exit by which the business can be accessed. For example, the greater the number of exits before the exit associated with the business at which advertisements are sent, the greater the chance that the advertising number customer may be charged.

Continuing to decision step 212, the server determines whether the portable communication device has moved out of range of the freeway exit. If not, the method returns to block 208, and the server retrieves another advertisement from the database and continues as described herein. At decision step 212, when the server determines that the portable communication device has moved out of range of the freeway exit, the method moves to block 214 and the server discontinues transmitting advertisements to the portable communication device. Next, at decision step 216, the server determines whether the portable communication device's communication with the network has ended. If not, the method returns to block 200 and continues as described herein. On the other hand, if the communication with the network has ended, the method moves to block 218 and the server discontinues monitoring the portable communication device. The method then ends at state 220.

Figure 3:
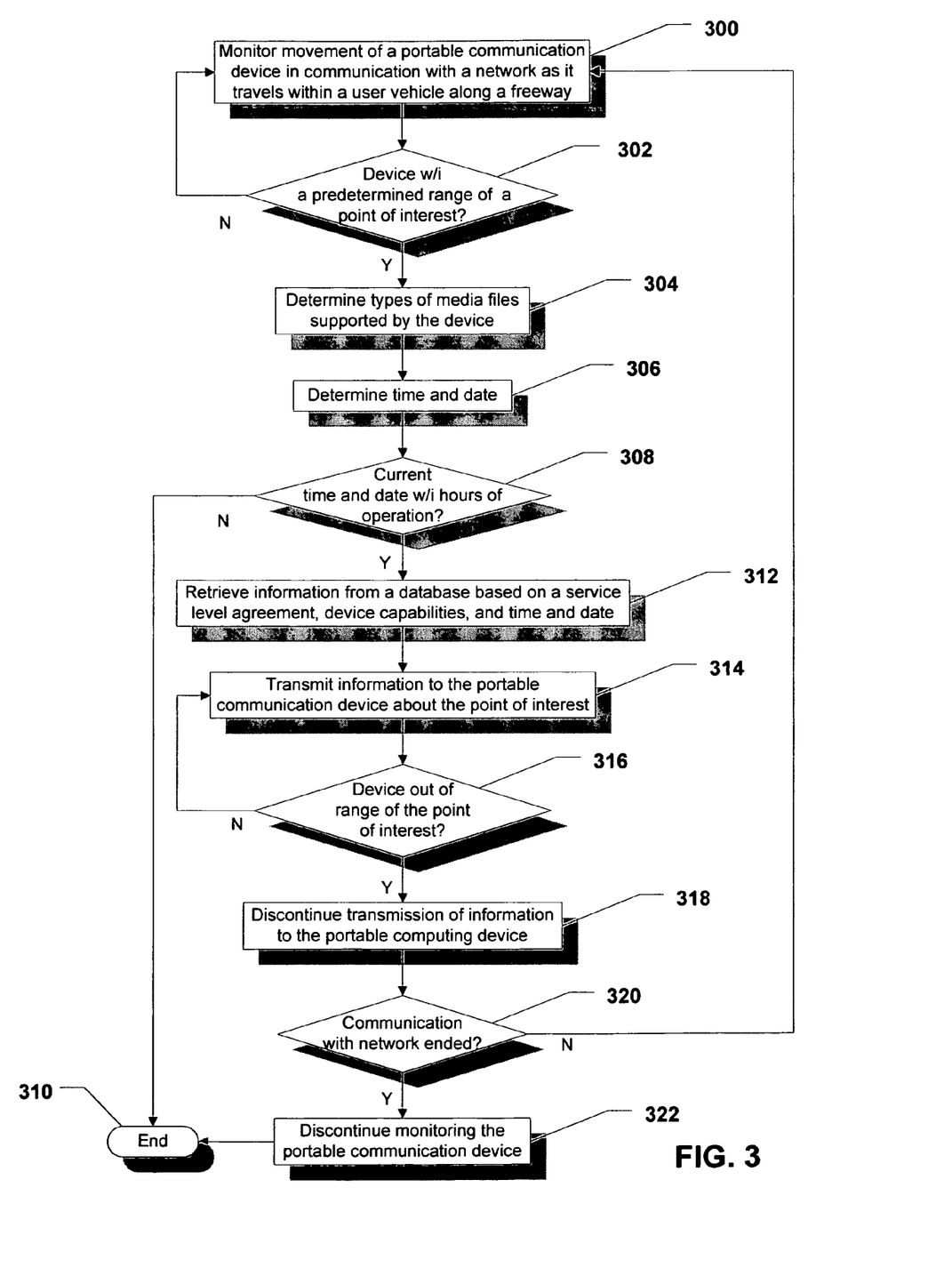
FIG. 3 is a flow chart to illustrate a method of transmitting information related to one or more points of interest.

Referring to FIG. 3, an alternative method of advertising to a wireless device is shown and commences at block 300. At block 300, a system server monitors the movement of a portable communication device while it is in communication with a network as it travels within a user vehicle along a freeway. At decision step 302, the server determines whether the device is within a predetermined range of a point of interest. In an illustrative embodiment, the point of interest can be a museum, a monument, a lake, or any other point of interest.

At decision step 302, if the portable communication device is not within range of the point of interest, the method returns to block 300 and the server continues to monitor the location of the portable communication device. On the other hand, at decision step 302, if the device is within a predetermined range of a point of interest, the method proceeds to block 304 and the server determines the type of media files that are supported by the portable communication device. Thereafter, at block 306, the server determines the current time and date. At decision step 308, the server determines whether the current time and date falls within the hours of operation for the particular point of interest. If the current time and date do not fall within the hours of operation of the particular point of interest, the method ends at state 310.

Moving to block 312, when the current time and date fall within the hours of operation of the particular point of interest, the server retrieves information about the point of interest from a database. The information can be retrieved based on a service level agreement associated with the point of interest, the device capabilities, and the time and date. The information can include hours of operation, directions, contact information, discounts, interesting facts, etc. In a particular embodiment, the server may not send an advertisement for a point of interest if the point of interest is closed.

Moving to block 314, the server transmits the information to the portable communication device. Next, at decision step 316, the server determines whether the portable communication device has moved out of range of the freeway exit. If the portable communication device has not moved out of range of the point of interest, the method returns to block 314 and the server continues transmitting information to the portable communication device about the point of interest. On the other hand, if the server determines that the portable communication device has moved out of range of the point of the interest, the method moves to block 318 and the server discontinues transmitting advertisements to the portable communication device. Thereafter, the method moves to decision step 320.

At decision step 320, the server determines whether the portable communication device's communication with the network has ended. If not, the method returns to block 300 and continues as described herein. On the other hand, if the communication with the network has ended, the method moves to block 322 and the server discontinues monitoring the portable communication device. The method then ends at state 310.

Figure 4:
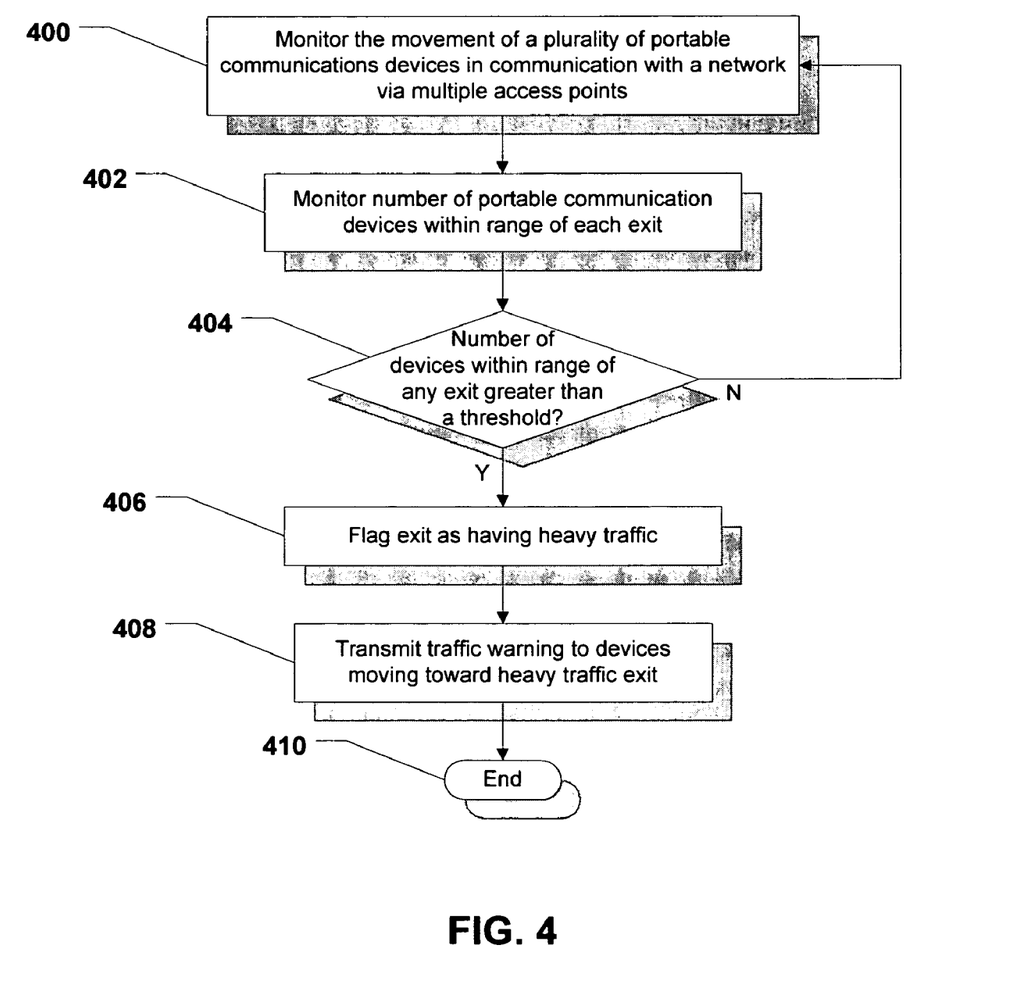
FIG. 4 is a flow chart to illustrate a method of transmitting traffic warnings to one or more portable communication devices.

Referring to FIG. 4, a method of transmitting traffic warnings to one or more portable communication devices is shown and commences at block 400. At block 400, a system server monitors the movement of a plurality of portable communications devices in communication with a network via multiple access points. Next, the server monitors the number of portable communication devices that are within range of each exit of a freeway at block 402. Moving to decision step 404, the server determines whether the number of devices within range of any exit greater than a predetermined threshold. If not, the method returns to block 400 and continues as described herein. On the other hand, if the number of devices within range of any exit is greater than the threshold, the method proceeds to block 406 and the server flags the exit as having heavy traffic, i.e., heavy vehicle traffic. Thereafter, at block 408, the server transmits a traffic warning to any devices that are moving toward the freeway exit that is flagged as having heavy traffic. The method then ends at state 410.

Figure 5:
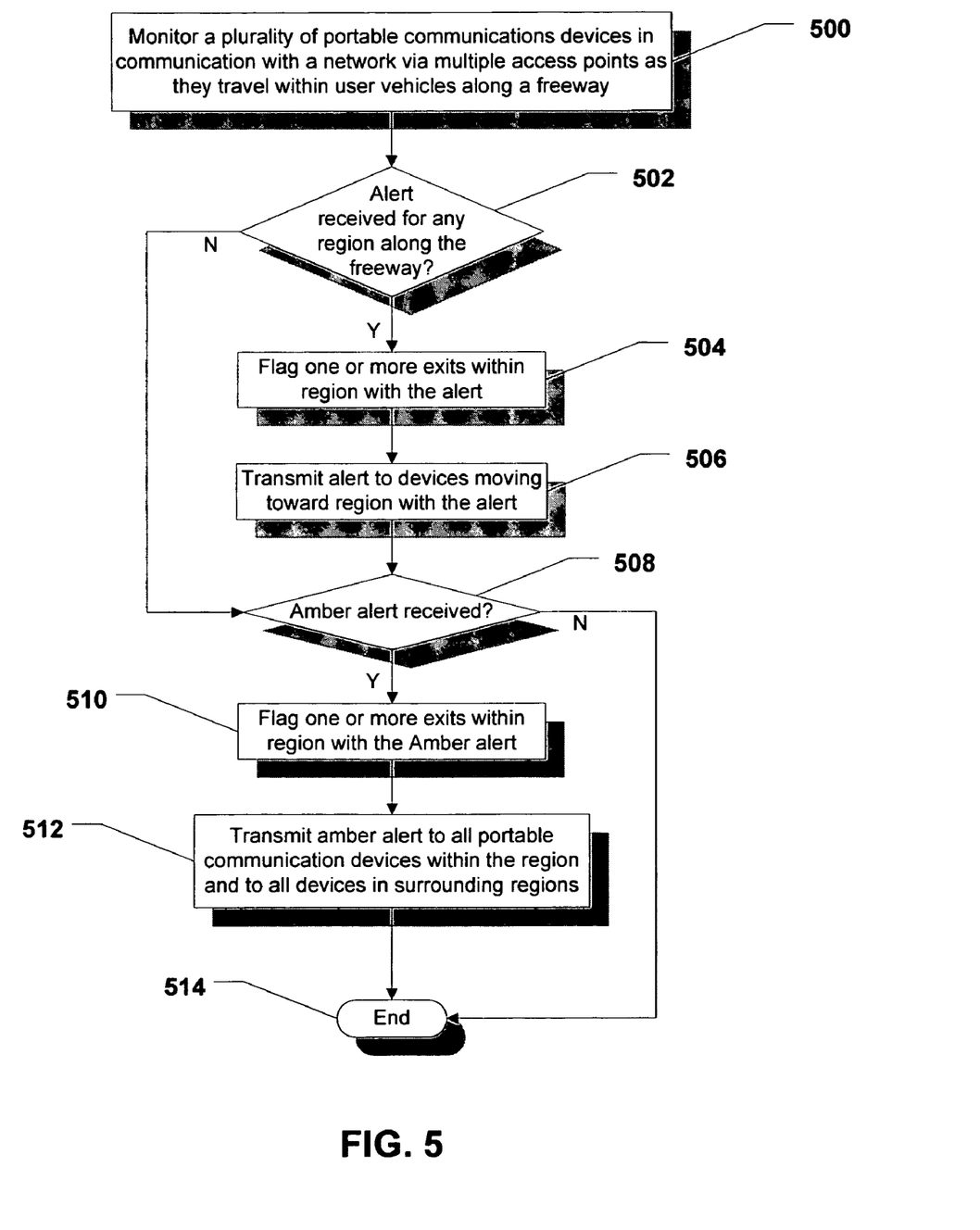
FIG. 5 is a flow chart to illustrate an alternative method of transmitting traffic warnings to one or more portable communication devices.

FIG. 5 shows an alternative method of transmitting traffic warnings to one or more portable communication devices. Commencing at block 500, a system server monitors the movement of a plurality of portable communications devices that are in communication with a network via multiple access points as they travel within user multiple vehicles along a freeway. Next, at decision step 502, the server determines whether an alert is received for any region along the freeway. In a particular embodiment, the alert can be a traffic alert, a lane closure alert, a weather alert, a road condition alert, or any other alert related to traffic or driving conditions.

At decision step 502, when an alert is received for a region, the method proceeds to block 504 and the server flags the region with an alert. Continuing to block 506, the server transmits the alert to the devices that are moving toward the region with the alert. Thereafter, the method moves to decision step 508. Returning to decision step 502, if an alert is not received, the method also proceeds to decision step 508. At decision step 508, the server determines whether an Amber alert is received for a region along the freeway. If so, the server flags the region with the Amber alert at block 510. Thereafter, a block 512, the server transmits the Amber alert to all portable devices within the region having the Amber alert and to all devices within regions surrounding the region with the Amber alert. The logic then ends at state 514. Returning to decision step 508, if an Amber alert is not received for a region, the logic ends at state 514.

Figure 6:
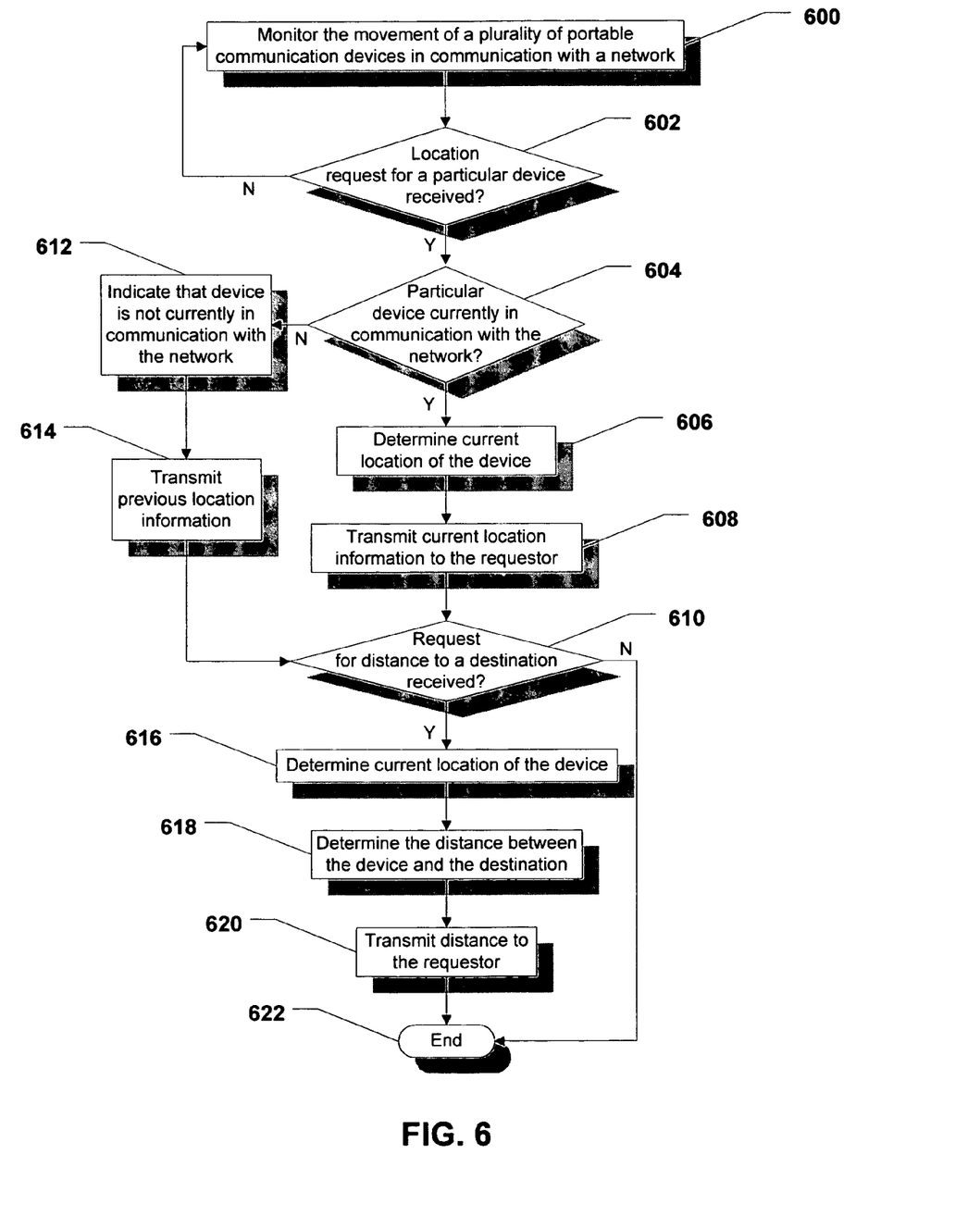
FIG. 6 is a flow chart to illustrate a method of transmitting information related to the location of a portable communication device.

Referring now to FIG. 6, a method of transmitting information related to the location of a portable communication device is shown and commences at block 600. At block 600, a system server monitors the movement of a plurality of portable communication devices in communication with a network. Next, at decision step 602, the server determines whether a location request for a particular portable communication device is received. In a particular embodiment, the request is sent from another user, e.g., a family member, via a computer connected to the Internet or Wide Area Network. However, the request can be received from the actual portable communication device that is the subject of the location request.

At decision step 602, if a location request is not received, the method returns to block 600 and continues as described herein. Conversely, if a location request is received for a particular portable communication device, the method proceeds to decision step 604. At decision step 604, the system server determines whether the particular portable communication device is currently in communication with the network. If so, the system server determines the current location of the device, at block 606, and transmits the current location information to the requester, at block 608. The method then continues to decision step 610.

Returning to decision step 604, if the particular portable communication device that is the subject of the location request is not currently in communication with the network, the method moves to block 612 and the server indicates that the device is not currently in communication with the network. At block 614, the server transmits the previous location information to the requestor. The method then proceeds to decision step 610.

At decision step 610, the server determines whether a request for distance to a destination is received. The request for the distance can be received from the particular communication device that is the subject of the distance request or from another device such as a computer coupled to the Internet or a Wide Area Network. If a request for distance is received, the method proceeds to block 616, and the server determines the current location of the device. Thereafter, at block 618, the server determines the distance between the device and the destination. Continuing to block 620, the server transmits the distance to the requestor. The method then ends at state 622. Returning to decision step 610, if a request for distance to a destination is not received, the method then ends at state 622.

In a particular embodiment, any of the methods described herein can be part of a subscription service. Further, in a particular embodiment, advertisements and other information can be sent to subscribing portable communication devices and not to non-subscribing portable communication devices. However, Amber alerts can be sent to all portable communication devices in communication with a data network regardless of subscription status.

With the configuration of structure described above, the system and method of providing advertisements to portable communication devices expands the potential market available via traditional advertising by including the various portable communication devices that are in constant use. Further, other information can be proactively sent to portable communication devices. That information can include weather alerts, traffic alerts, road condition alerts, Amber alerts, etc. Also, the system can be used to deliver movies on demand via the network provided.

Other information may be sent to the portable communication devices. For example, membership alerts may be sent to members of certain groups, e.g., the American Automobile Association (AAA). Also, healthcare information, such as hospital locations, may be sent to individuals with health concerns traveling in unfamiliar areas. Additionally, certain advertisements may be broadcast to all devices in communication with the network. On the other hand, certain advertisements may be unicast to particular portable communication devices, e.g., to existing customers of a particular business.

In an alternative embodiment, searches can be initiated from a portable communication device. A search can be initiated using a voice command, a text message, transmitting a picture to the network, swiping a credit card at a portable communication device (e.g., to locate a particular gas station), passing a Bluetooth device near a Bluetooth enabled portable communication device, etc.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of advertising, the method comprising:
    monitoring a location of one or more portable communication devices in communication with a data network as the one or more portable communication devices travel within a user vehicle;
    determining whether the one or more portable communication devices are within a predetermined range of a point-of-interest;
    retrieving information about the point-of-interest, wherein the information includes hours of operation of the point-of-interest;
    determining one or more types of media files supported by the one or more portable communication devices;
    determining a current time; and
    transmitting one or more advertisements related to the point-of-interest to the one or more portable communication devices when the one or more portable communication devices are within the predetermined range of the point-of-interest and when the current time is within the hours of operation of the point-of-interest,
    wherein an advertising cost associated with a particular advertisement sent to a particular portable communication device is determined based on a distance between the particular portable communication device and the point-of-interest.

2. The method of claim 1, further comprising polling the one or more portable communication devices in order to determine the one or more types of media files supported.

3. The method of claim 1, querying a database in order to determine the one or more types of media files supported by the one or more portable communication devices.

4. The method of claim 3, wherein the database is queried with a user identification associated with the one or more portable communication devices.

5. The method of claim 4, wherein the database is queried with a make and model identification associated with the one or more portable communication devices.

6. A system, comprising:
    at least one wireless communication access point;
    a database coupled to a server storing one or more media files associated with one or more advertisements, the database storing information concerning the one or more types of media files supported by one or more portable communication devices; and
    a the server coupled to the database and having access to the at least one wireless communication access point, the server comprising:
        a processor;
        a computer readable medium accessible to the processor; and
        a computer program embedded within the computer readable medium, the computer program comprising:
            instructions to monitor the location of the one or more portable communication devices in communication with a data network as the one or more portable communication devices travel within a user vehicle;
            instructions to determine whether the one or more portable communication devices are within a predetermined range of a point-of-interest;
            instructions to retrieve information about the point-of-interest, wherein the information includes hours of operation of the point-of-interest;
            instructions to determine the one or more types of media files supported by the one or more portable communication devices;
            instructions to determine a current time; and
            instructions to transmit one or more advertisements related to the point-of-interest to the one or more portable communication devices when the one or more portable communication devices are within the predetermined range of the point-of-interest and when the current time is within the hours of operation of the point-of-interest,
        wherein an advertising cost associated with a particular advertisement sent to a particular portable communication device is determined based on a distance between the particular portable communication device and the point-of-interest.

7. The system of claim 6, wherein the computer program further comprises instructions to poll the one or more portable communication devices in order to determine the one or more types of media files supported by the one or more portable communication devices.

8. The system of claim 7, wherein the computer program further comprises instructions to query the database to determine the one or more types of media files supported by the one or more portable communication devices.

9. The system of claim 8, wherein the database is queried with a user identification.

10. The system of claim 8, wherein the database is queried with a make and model identification.

11. The system of claim 6, wherein the database further stores a service tier associated with one or more service level agreements, each of the one or more service level agreements associated with an advertising customer.

12. The system of claim 11, wherein the service tier limits the type of media files sent as advertisements to the one or more portable communication devices.

13. A server, comprising:
    a processor;
    a computer readable medium accessible to the processor; and
    a computer program embedded within the computer readable medium, the computer program comprising;
        instructions to monitor a location of a portable communication device traveling within a user vehicle;

instructions to determine whether the portable communication device is within a predetermined range of a point-of-interest;

instructions to retrieve information about the point-of-interest, wherein the information includes hours of operation of the point-of-interest;

instructions to determine a current time;

instructions to retrieve at least one advertisement related to the point-of-interest from a database, the advertisement having a format based on a media file type supported by the portable communication device and based on a service tier, wherein the media file type complies with one of the service tier and a lower service tier; and instructions to transmit the advertisement when the portable communication device is within the predetermined range of the point-of-interest and the current time is within the hours of operation of the point-of-interest, wherein an advertising cost associated with the advertisement sent to the portable communication device is determined based on a distance between the portable communication device and the point-of-interest.

14. The server of claim 13, wherein the computer program further comprises instructions to transmit the advertisement to the portable communication device.

15. The server of claim 14, wherein the computer program further comprises instructions to charge an advertising customer based on the advertising cost.

16. The method of claim 1, wherein the advertising cost increases when the distance increases and wherein the advertising cost decreases when the distance decreases.

17. The method of claim 1, wherein the particular portable communication device is on a freeway and wherein the distance is measured in a number of freeway exits.

18. The method of claim 1, wherein the advertising cost is further determined based on a service tier associated with the particular advertisement, wherein a first service tier provides for text message advertisements, a second service tier provides for still graphical advertisements, a third service tier provides for streaming video and audio advertisements, and a fourth service tier provides for real-time voice and video advertisements.

19. The method of claim 18, further comprising charging for transmitting the advertisement based on one or more types of media files supported by the portable communication devices, the service tier, and the advertising cost.

* * * * *